No. 847,632. PATENTED MAR. 19, 1907.
W. O. AMSLER.
GLASS MELTING FURNACE.
APPLICATION FILED AUG. 15, 1906.
3 SHEETS—SHEET 1.

WITNESSES:
INVENTOR
Walter O. Amsler
by
ATTORNEY

No. 847,632.  
PATENTED MAR. 19, 1907.

W. O. AMSLER.  
GLASS MELTING FURNACE.  
APPLICATION FILED AUG. 15, 1906.

3 SHEETS—SHEET 3.

WITNESSES:

INVENTOR
Walter O. Amsler
by W. G. Doolittle
ATTORNEY

UNITED STATES PATENT OFFICE.

WALTER O. AMSLER, OF PITTSBURG, PENNSYLVANIA.

GLASS-MELTING FURNACE.

No. 847,632.  Specification of Letters Patent.  Patented March 19, 1907.

Application filed August 15, 1906. Serial No. 330,630.

*To all whom it may concern:*

Be it known that I, WALTER O. AMSLER, a citizen of the United States, residing at Pittsburg, in the county of Allegheny and State of Pennsylvania, have invented new and useful Improvements in Glass-Melting Furnaces, of which the following is a specification.

My invention relates to a glass-melting furnace, and more particularly to a regenerative tank-furnace for the continuous melting of glass.

To this end the present invention consists in a new and improved glass-melting furnace, in the novel features of construction, and in the combination of parts, all as fully hereinafter described and claimed.

Figure 1:
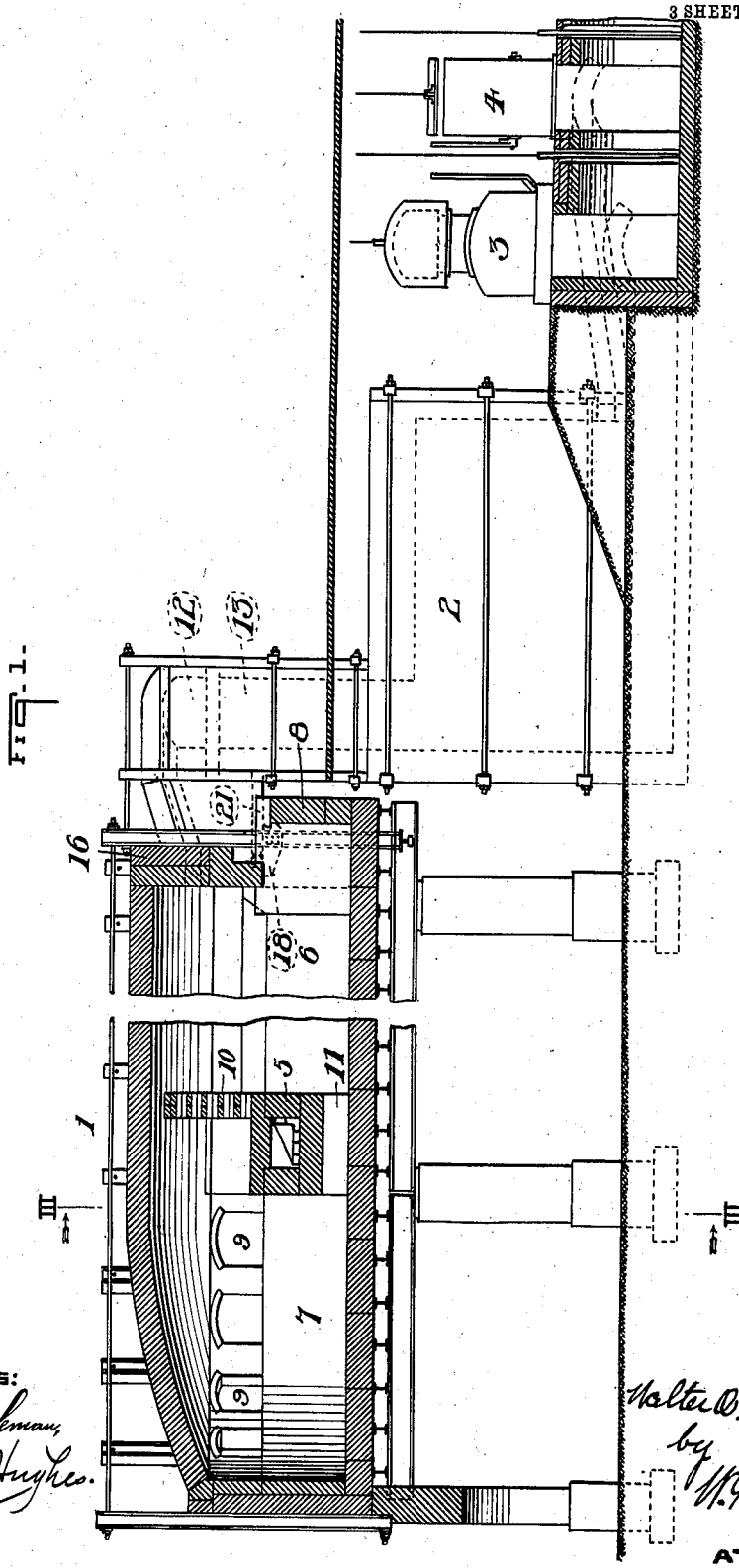
Figure 2:
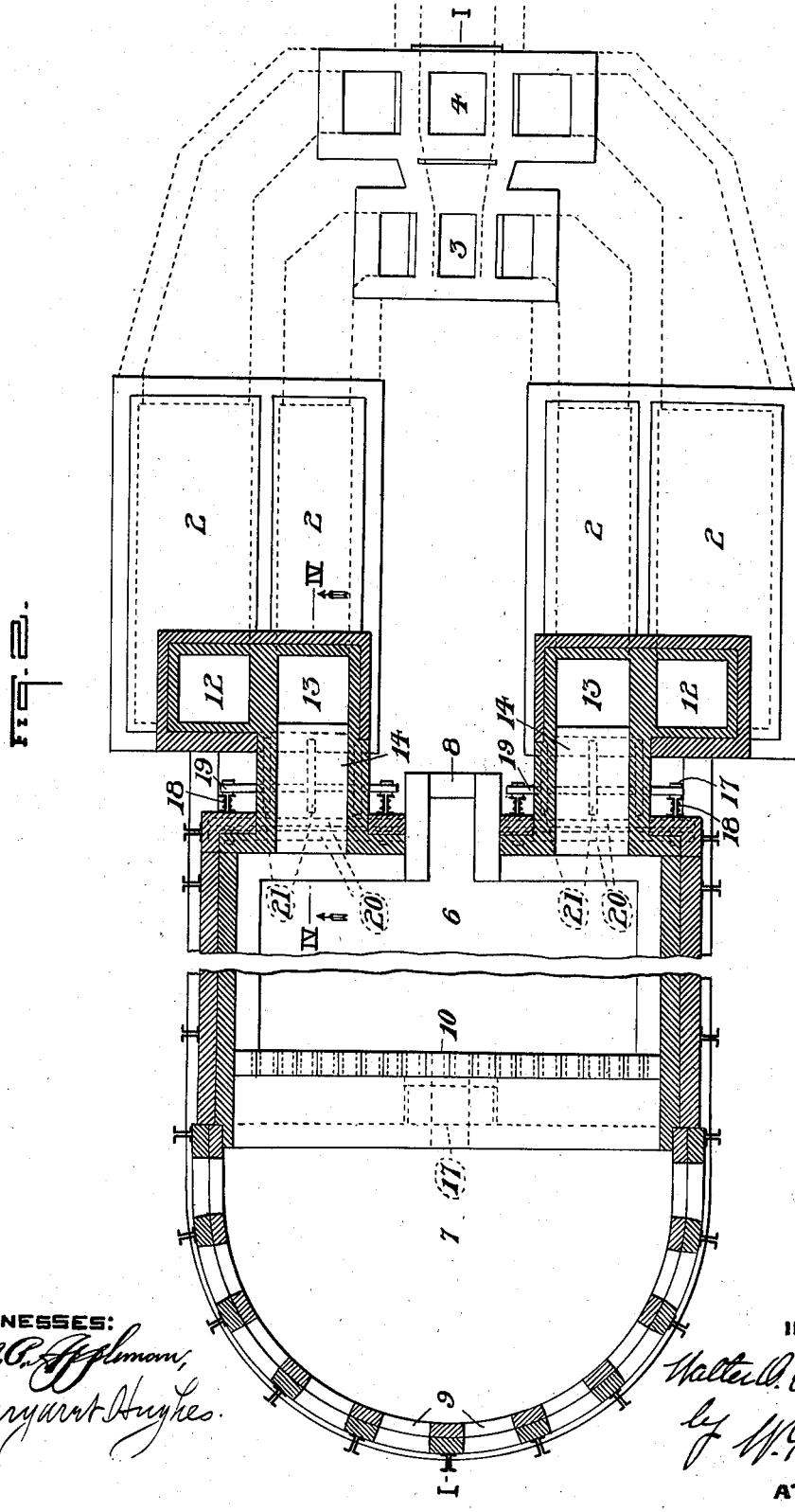
Figure 3:
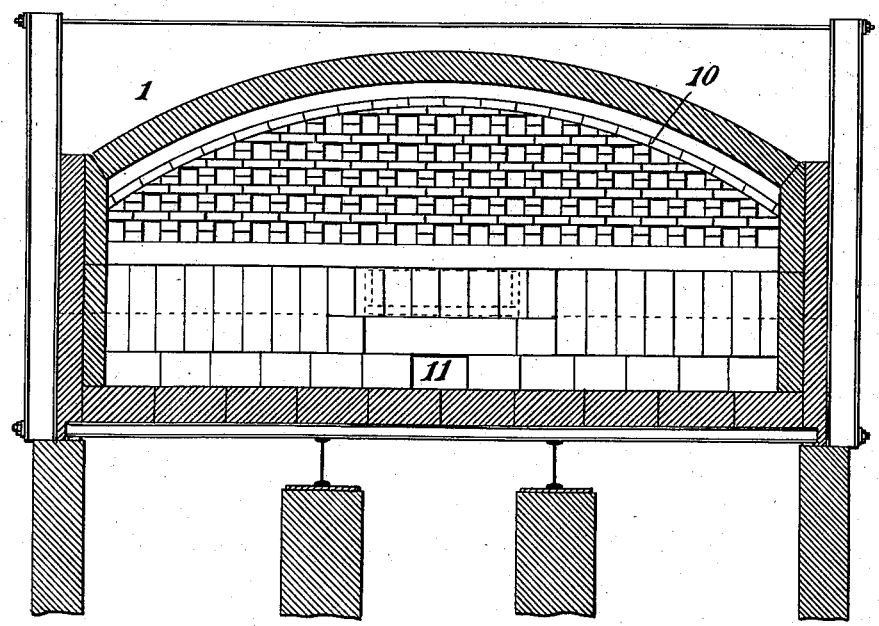
Figure 4:
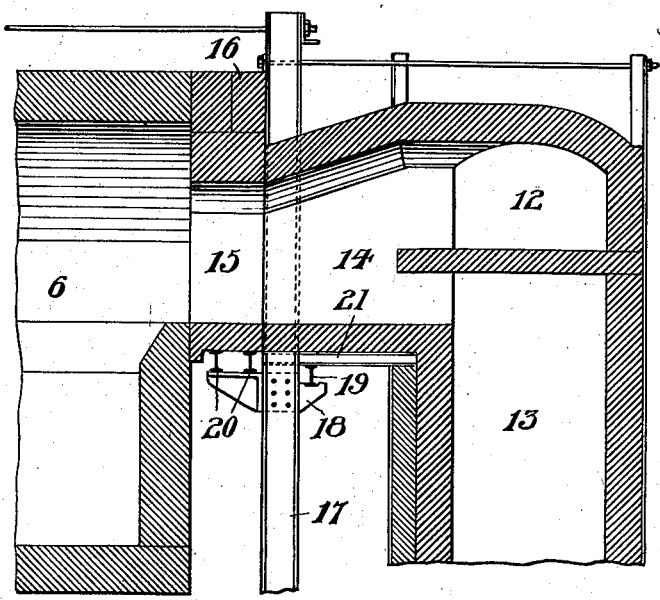

In the accompanying drawings, which illustrate an application of my invention, Figure 1 is a part longitudinal sectional view and a part elevational view of a glass-melting furnace constructed in accordance with my invention, the section being taken on line I I of Fig. 2; Fig. 2, a sectional plan; Fig. 3, a vertical section taken on line III III of Fig. 1, and Fig. 4 a vertical sectional view taken on line IV IV of Fig. 2.

Referring to the drawings I have shown a regenerative continuous glass-melting furnace plant comprising a tank 1, regenerators 2 2, gas-valve 3, air-valve 4, and their connections. The tank as illustrated is divided by a bridge-wall 5 into compartments 6 and 7. The melting compartment or chamber 6 at one end communicates with a centrally-located "dog-housing" 8, through which the charges are introduced into the melting-compartment. The semicircular wall of the other compartment or chamber 7 is formed with working-out holes 9, as is usual in tank-furnaces of this class. I desire to call particular attention to the location of and to the means for introducing the charges to the melting-chamber.

Another characteristic and important feature of the present invention is a checkerwork baffle-wall 10. This wall, as shown by the drawings, is built upon the bridge-wall 5, and preferably extends upwardly to within a short distance of the roof of the furnace. The purpose of wall 10 is to prevent the full sweep of the mixed air and gas into and through the compartment 7, thereby maintaining a proper working-out temperature in said compartment and enabling a higher temperature to be maintained where needed—namely, in the melting-compartment. 6

11 designates a passage through the bridge-wall connecting compartments 6 and 7. Air and gas passages 12 and 13, leading to and from the respective pairs of regenerators, unite to form a throat or passage 14, which throat or passage communicates with an opening 15, formed in the rear wall 16 of the furnace. Heretofore, so far as I am aware, the throats or passages 14 have been supported upon or by the rear wall of the tank, and when it becomes necessary to repair or replace the said rear wall, as is frequently the case in the operation of glass-melting furnaces of this class, the said throats or passages and the rear wall of the furnace, which may not and usually do not need repairing, have had to be partially or wholly torn down and rebuilt. In my construction the throats or passages are supported by means entirely independent of the tank or its rear wall, and consequently the wearing away or destruction of said wall and its subsequent repair or replacement does not affect the throats or passages, nor the rear wall of the furnace.

The means for supporting the respective throats or passages and the rear wall of the furnace, as illustrated and as preferred, comprise a steel framing comprising two suitably-braced columns 17, each having a bracket 18 secured thereto, cross-beams 19 and 20, mounted on the brackets, and beams 21.

What I claim is—

1. The combination with a regenerative glass-melting tank-furnace, of regenerators having throats or passages in communication with the tank, said regenerators and throats or passages all located on one side of the tank and means independent of the tank for supporting the throats or passages.

2. The combination with a regenerative glass-melting tank-furnace, of regenerators located near an end of the tank, throats leading from the regenerators to an end of the tank, and means independent of the tank for supporting the throats.

3. The combination with a regenerative glass-melting tank-furnace, of regenerators located near an end of the tank, throats leading from the regenerators to an end wall of the furnace and in communication with an end of the tank, and means independent of the tank for supporting the throats and end wall.

4. The combination with a regenerative glass-melting tank-furnace, of regenerators having passages in communication with the tank, all located on one side of the tank, and a metallic framework independent of the tank for supporting the passages.

5. The combination with a regenerative glass-melting tank-furnace, of regenerators all located on one side of the tank, passages leading from the regenerators and in communication with the tank, and means independent of the tank for supporting each passage comprising columns, located at the sides of the passage and cross members connecting the columns.

6. The combination with a regenerative glass-melting tank-furnace, of regenerators located near an end of the tank having throats in communication with an end of the tank, means independent of the tank for supporting the throats, and a central charging-opening in an end wall of the tank located between the throats.

7. The combination, with a regenerative glass-melting tank-furnace, of regenerators, passages connecting the regenerators and the tank, a bridge-wall dividing the tank into compartments, and a checker-work baffle-wall built upon the bridge-wall.

8. The combination with a regenerative glass-melting tank-furnace, of regenerators, passages connecting the regenerators and the tank, a bridge-wall dividing the tank into compartments having its upper portion formed of checker-work and extended to within a short distance of the roof of the furnace.

9. The combination with a regenerative glass-melting tank-furnace having its tank divided into two compartments by a bridge-wall, a checker-work baffle-wall built upon the bridge-wall, regenerators having throats or passages in communication with the tank, said regenerators and throats or passages all located on one side of the tank.

10. The combination with a regenerative glass-melting furnace having its tank divided into two compartments by a bridge-wall, a checker-work baffle-wall built upon the bridge-wall, regenerators having throats in communication with the tank, said regenerators and throats all located on the same side of the tank, and means independent of the tank for supporting the throats.

11. The combination with a regenerative glass-melting furnace having its tank divided into two compartments by a bridge-wall, a checker-work baffle-wall built upon the bridge-wall, regenerators located on the same side and near an end of the tank, throats leading from the regenerators to an end of the tank, a central charging-opening in an end wall of the tank, and means independent of the tank for supporting the throats.

In testimony whereof I affix my signature in presence of two subscribing witnesses.

WALTER O. AMSLER.

Witnesses:
W. G. DOOLITTLE,
MARGARET HUGHES.